United States Patent Office.

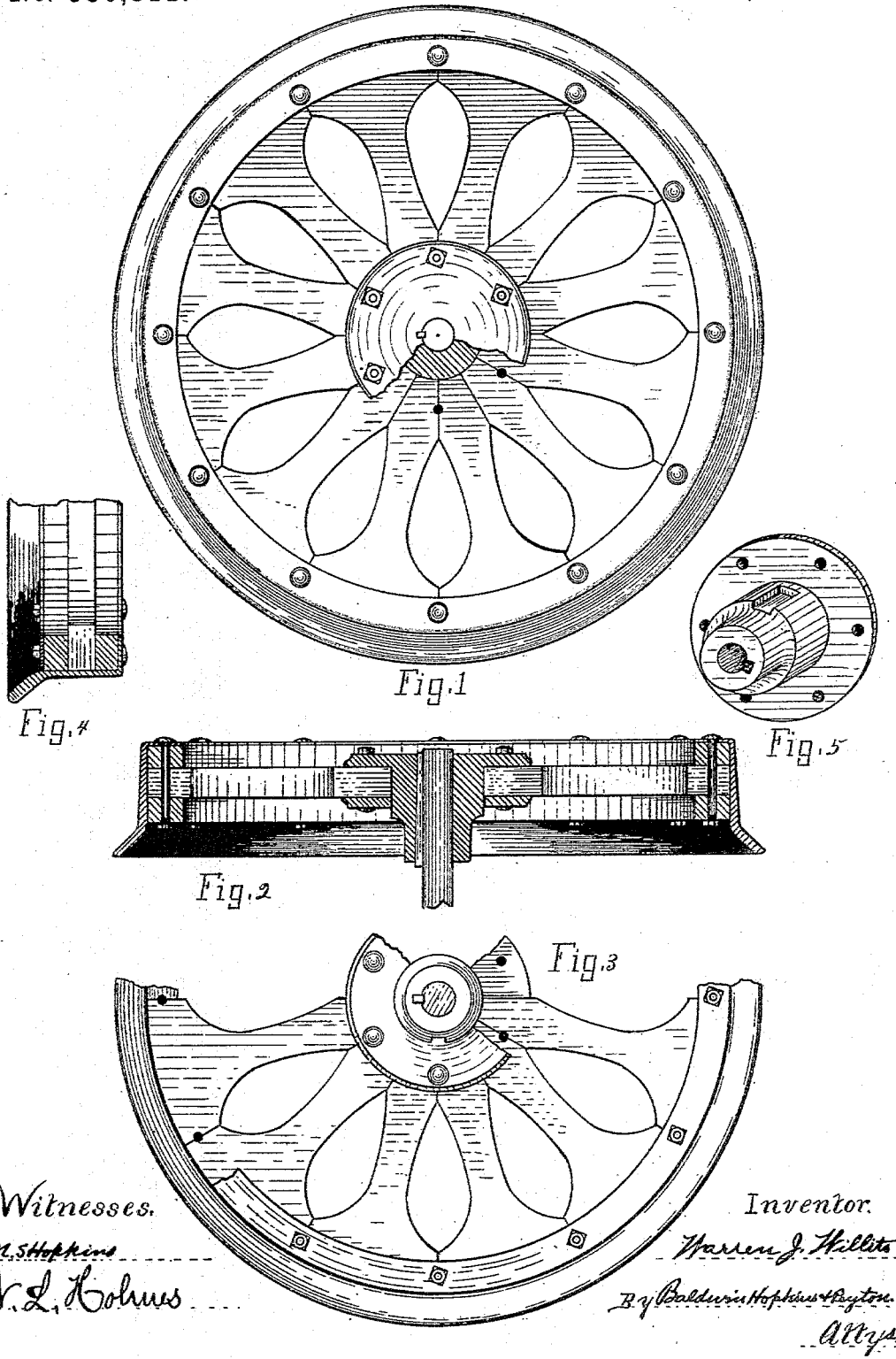

WARREN J. WILLITS, OF THREE RIVERS, MICHIGAN, ASSIGNOR TO THE SHEFFIELD VELOCIPEDE CAR COMPANY, OF SAME PLACE.

TIRE FOR CAR-WHEELS.

SPECIFICATION forming part of Letters Patent No. 356,811, dated February 1, 1887.

Application filed November 29, 1886. Serial No. 220,196. (No model.)

*To all whom it may concern:*

Be it known that I, WARREN J. WILLITS, of Three Rivers, in the county of St. Joseph and State of Michigan, have invented a certain new and useful Improvement in Tires for Car-Wheels, of which the following is a specification, reference being had to the accompanying drawings.

My tire is an improvement upon that patented to myself and Edward B. Linsley, April 27, 1886, No. 340,845, and is especially applicable to light car-wheels, such as are used upon velocipede hand-cars. In the said patent an improved tire is shown, made of plate metal of substantially uniform thickness, and provided with an outer and inner flange and tread, all in one piece. The objection to that patented tire is that while it is convenient to manufacture and has certain economical advantages in that respect, and can be sufficiently fastened to the rim of the wheel-body by bolts passing only through the inwardly-projecting flange, and is a manifest improvement as compared with what had preceded it, yet it is not, as it was supposed to be at the time, a tire in which the minimum amount of metal is used requisite for the proper degree of strength and durability.

The object of my present invention is to provide a tire with the minimum weight and maximum strength and wearing qualities.

It is a material consideration of great practical importance to reduce the weight of handcars, as well as other light vehicles, by every possible means consistent with maintaining the proper strength and durability, and the development of hand-cars by invention shows steady and uniform progress, little by little, for many years past in the direction of lightness without loss of strength or durability—in fact, with a gain in both these desirable qualities.

An improvement in the structure of a handcar where the greatest speed and the least propelling power are sought to be provided for, by which the weight can be reduced so much as five pounds without diminishing the strength or wearing qualities, is of such material importance in practice as to be controlling in the manufacture and sale of hand-cars. In other words, the wisdom of experience decides at once in favor of the pactical superiority of every car embodying even apparently so little advancement or improvement in its construction.

In the accompanying drawings, Figure 1 is a side view of a car-wheel with my improved tire applied. Fig. 2 is a diametrical section of the same. Fig. 3 is a segmental opposite side view to that of Fig. 1. Fig. 4 is a sectional detail of a tire and its fastenings, and Fig. 5 is a view of the hub.

I have found by experiments that the greatest weight and thickness of metal in tires for hand-car wheels and the like is required in the outwardly-projecting rail-flanges, and that the tread and inwardly-projecting flange can safely be made much thinner and lighter than the rail-flange—in fact, the inwardly-projecting flange may be made much thinner than the tread portion of the tire. I therefore make a wrought-metal tire either of steel or iron plates, that are rolled out to the desired width and thickness, and after being cut to proper lengths welded into a ring and then bent to shape at its opposite edges to form the flanges, substantially in the manner set out in the said patent.

My improvement consists in forming the plate for the tread and flanges beveled from edge to edge or reduced in thickness at the tread portion and still more at the part forming the inwardly-projecting flange. I have found that a thickness of one-fourth of an inch on one edge and one-eighth of an inch on the other make a very desirable-shaped bar or plate for bending and flanging to make a tire; but these proportions may be varied, the idea being to form a tire with sufficient thickness and strength in the rail-flange and with less thickness in the tread and inwardly-projecting flange, where less strength is required, and so that the tire may be as light as possible and yet heavy and strong enough for practical purposes.

The details of my improved car-wheel with my improved tire-plate are substantially as shown in the accompanying drawings and described in the said patent, and I therefore omit to describe the parts of the wheel in detail by letter.

In the tire, A indicates the rail-flange, thicker than the tread B and inwardly-projecting fastening-flange C, as well shown in section in Figs. 2 and 4.

By my improvement I not only secure lightness and a saving of metal that are material considerations of utility, but by using a beveled plate of steel or iron (the bevel preferably all on one side of the plate, and that the outer periphery of the tire) I secure what is always desirable in a tire for a car-wheel—an inclined or coning tread, as it is called. This is an advantage not incident to my said patented invention, and is practically important.

Having described my improvement, what I claim as new, and desire to secure by Letters Patent of the United States, is—

A wrought plate-metal tire having outwardly and inwardly projecting flanges A and C, bent into shape from a beveled tire-ring, so that the rail-flange A is thicker than the fastening-flange C, the latter being provided with bolt-holes, substantially as set forth.

In testimony whereof I have hereunto subscribed my name.

WARREN J. WILLITS.

Witnesses:
I. N. BUSON,
LESTER B. PLACE.